United States Patent Office 3,400,105
Patented Sept. 3, 1968

3,400,105
RUBBER ACCELERATORS
Albert F. Hardman, Bath, Ohio, assignor to The Goodyear Tire & Rubber Company, Akron, Ohio, a corporation of Ohio
No Drawing. Filed Dec. 31, 1964, Ser. No. 422,530
10 Claims. (Cl. 260—79.5)

This invention relates to a new class of imine compounds and the applications of these substances to the acceleration of rubber vulcanization.

The new imine compounds of this invention have the following structural formula:

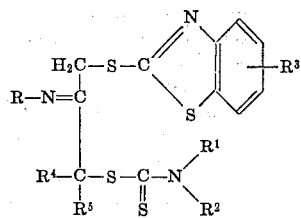

wherein R is selected from the group consisting of hydrogen, furfuryl radicals, alkyl radicals containing from 1 to 10 carbon atoms, cycloalkyl radicals containing from 5 to 6 carbon atoms, aryl radicals containing from 6 to 10 carbon atoms and aralkyl radicals containing from 7 to 10 carbon atoms; $R^1$ and $R^2$ are selected from the group consisting of hydrogen and alkyl radicals containing from 1 to 10 carbon atoms and radicals in which $R^1$ and $R^2$ together with the nitrogen atoms form a heterocyclic ring; $R^3$ is selected from the group consisting of hydrogen and alkyl radicals containing from 1 to 10 carbon atoms; and $R^4$ and $R^5$ are selected from the group consisting of hydrogen and alkyl radicals containing from 1 to 6 carbon atoms.

The above described class of imine compounds may be prepared by reacting an acetylalkyl dialkyldithiocarbamate with 2,2'-dithiobisbenzothiazole and a nitrogen containing compound which may be ammonia or a primary amine. This reaction normally proceeds at a satisfactory rate at room temperature or at slightly elevated temperatures. An inert organic solvent such as methanol, ethanol, isopropanol, tetrahydrofuran, ethyl ether, benzene or toluene is generally used in the reaction. The acetylalkyl dialkyldithiocarbamate that may be employed as one of the reactants to produce the compounds of the present invention is conventionally prepared by any convenient method such as the reaction of a monochloroketone with a salt of a dithiocarbamic acid.

The primary amines that may be employed in preparing compounds of this invention conform to the following structural formula, R—NH₂, wherein R is selected from the group consisting of alkyl radicals containing from 1 to 10 carbon atoms, furfuryl radicals, cycloalkyl radicals containing from 5 to 6 carbon atoms, aryl radicals containing from 6 to 10 carbon atoms, and aralkyl radicals containing from 7 to 10 carbon atoms. Specific examples of suitable amines include methylamine, ethylamine, n-propylamine, isopropylamine, tertiary butylamine, cyclopentylamine, cyclohexylamine, aniline, ortho-toluidine, meta-toluidine, para-toluidine, orthoanisidine, meta-anisidine, para-anisidine, ortho-phenetidine, meta-phenetidine, para-phenetidine, benzylamine and α,α-dimethylbenzylamine.

An example of the above described reaction by which the accelerators of the present invention may be prepared appears to proceed according to the following equation in which acetonyl dimethyldithiocarbamate is reacted with 2,2'-dithiobisbenzothiazole and ammonia in a methanol solvent to produce 1-(2'-benzothioazolylthio)-3-(dimethylthiocarbamoylthio)-isopropylidenimine:

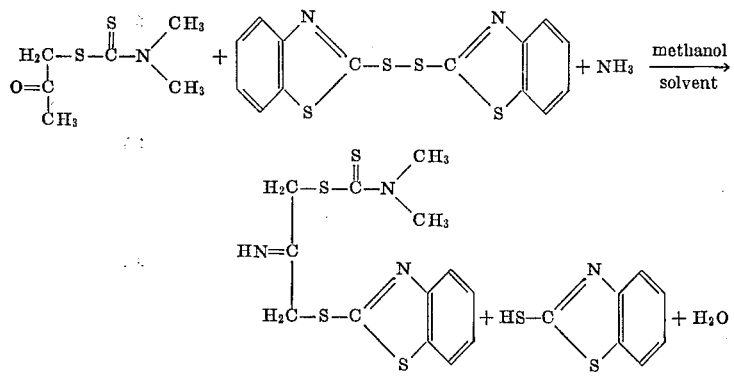

The following representative examples illustrate the detailed preparation of specific species of the accelerators of the invention.

EXAMPLE 1

Preparation of 1-(2'-benzothiazolylthio)-3-(dimethylthiocarbamoylthio)-isopropylidenimine Thirty-five grams of 2,2'-dithiobisbenzothiazole, 18 grams of acetonyl dimethyldithiocarbamate and 30 milliliters of methanol containing 2.0 grams of ammonia dissolved therein were thoroughly mixed in a glass flask and permitted to react for approximately 24 hours with occasional stirring. The solid crystalline reaction product which formed in the flask was isolated. Recrystallization of a portion of the crude product from benzene gave crystalline material having a melting point of 185 to 186° C. Analysis of the product for nitrogen and sulfur showed the following:

Calculated for $C_{13}H_{15}N_3S_4$, Nitrogen, 12.33%, Sulfur, 37.5%. Found N, 12.3%, S, 38.0%.

EXAMPLE 2

Preparation of N-cyclohexyl-1-(2'-benzothiazolylthio)-(3-dimethylthiocarbamoylthio)-isopropylidenimine Thirty-five grams of 2,2'-dithiobisbenzothiazole, 18 grams of acetonyl dimethyldithiocarbamate and 22 milliliters of cyclohexylamine were thoroughly mixed in 100 milliliters of methanol. The reactants were permitted to inter-react for approximately 24 hours at room temperatuate. Recrystallization of a portion of the crude product from toluene gave a crystalline material having a melting point of 184 to 185° C. Analysis of the product for nitrogen and sulfur showed the following:

Calculated for $C_{19}H_{25}N_3S_4$, Nitrogen, 9.61%; Sulfur, 29.4%. Found N, 9.93%; S, 30.3%.

In addition to acetonyl dimethyldithiocarbamate that has been employed as a dithiocarbamate in the above examples, other suitable dithiocarbamates that may be employed in preparing the accelerators of this invention conform to the following structural formula:

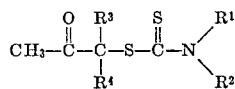

wherein $R^1$ and $R^2$ are selected from the group consisting of hydrogen and alkyl radicals containing from 1 to 10 carbon atoms and radicals in which $R^1$ and $R^2$ together with the nitrogen atom form a heterocyclic ring; and $R^3$ and $R^4$ are selected from the group consisting of hydrogen and alkyl radicals containing from 1 to 6 carbon atoms. Specific examples of useful dithiocarbamates include:

acetonyl dimethyldithiocarbamate
acetonyl diethyldithiocarbamate
acetonyl diisopropyldithiocarbamate
acetonyl di-n-butyldithiocarbamate
acetonyl dibenzyldithiocarbamate
acetonyl 4-morpholinecarbodithioate
acetonyl 1-piperidinecarbodithioate
1-acetylethyl dimethyldithiocarbamate
1-acetylethyl dibenzyldithiocarbamate
1-acetylethyl 4-morpholinecarbodithioate
1-acetylpropyl dimethyldithiocarbamate
1-acetylpropyl dibenzyldithiocarbamate
1-acetylpropyl 4-morpholinecarbodithioate
1-acetylisobutyl dimethyldithiocarbamate
1-acetyl-n-butyl dimethyldithiocarbamate
1-acetyl-n-hexyl dimethyldithiocarbamate
2-acetyl-2-propyl dimethyldithiocarbamate
2-acetyl-2-propyl dibenzyldithiocarbamate
2-acetyl-2-propyl 4-morpholinecarbodithioate
2-acetyl-2-butyl dimethyldithiocarbamate
3-acetyl-3-pentyl dimethyldithiocarbamate In preparing the accelerators of the present invention the dithiocarbamates and the 2,2'-dithiobisbenzothiazole are generally employed in approximately equal molar proportions. At least one mol of ammonia or amines is employed for each mol of dithiocarbamate used. As indicated in the preceding examples, the reaction proceeds readily at room temperature and is essentially complete after five or six hours, although the reaction mixture may be allowed to stand for a longer period of time to permit a more complete crystal formation of the desired product.

The accelerators prepared in Examples 1 and 2 above were tested in the following natural rubber tread stock in comparison with the following control stock; in both formulations all proportions are expressed as parts by weight per 100 parts by weight of rubber hydrocarbon.

|  | Test Stock | Control Stock |
| --- | --- | --- |
| Smoked sheet | 100 | 100 |
| Carbon black | 50 | 50 |
| Stearic acid | 3 | 3 |
| Processing oil | 3 | 3 |
| Zinc oxide | 3 | 3 |
| Experimental accelerator | 0.5 |  |
| (2,2'-dithiobisbenzothizaole)[1] |  | 0.75 |

[1] A commercially available accelerator.

The physical characteristics of the above described rubber compositions after curing are shown in the following table. All of these rubber stocks were cured at 275° F. for 30 minutes.

|  | Accelerator | | |
| --- | --- | --- | --- |
|  | 0.5 part of product of Example 1 | 0.5 part of product of Example 2 | (Control) 0.75 part of commercial accelerator |
| Ultimate tensile, p.s.i | 3,600 | 3,300 | 3,160 |
| Percent elongation at break | 530 | 540 | 520 |
| Modulus at 300% elongation, p.s.i | 1,700 | 1,500 | 1,500 |

Any of the sulfur curable rubber compositions may be advantageously compounded to contain an effective accelerating amount of the new accelerators of this invention generally in the range of 0.05 to 5.0 parts by weight per 100 parts by weight of rubber. The new accelerators of this invention are effective in rubbers which contain carbon to carbon unsaturation and are therefore sulfur curable. These rubbers include both natural and synthetic rubbers. Representative examples of synthetic rubbers include polychloroprene, polyisoprene and polybutadiene, and in particular, polyisoprenes and polybutadienes having essentially all of their monomer units combined in a cis-1,4 structure; the rubbery copolymers of butadiene and styrene which may contain from 50 to 90 percent or more of butadiene; butyl rubber, which is a polymerization product of a major proportion of isobutylene and a minor proportion of a diene such as butadiene or isoprene; and rubbery terpolymers of ethylene, propylene and a non-conjugated diene.

Having provided a complete description of the invention in such manner as to distinguish it from other inventions and from what is old, and having provided a description of the best mode contemplated of carrying out the invention, the scope of patent protection to be granted the invention is defined by the following claims.

What is claimed is:

1. A compound conforming to the following structural formula:

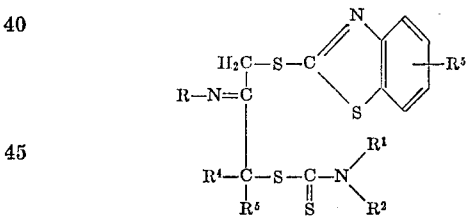

wherein R is selected from the group consisting of hydrogen, furfuryl radicals, alkyl radicals containing from 1 to 10 carbon atoms, cycloalkyl radicals containing from 5 to 6 carbon atoms, aryl radicals containing from 6 to 10 carbon atoms and aralkyl radicals containing from 7 to 10 carbon atoms, $R^1$ and $R^2$ are selected from the group consisting of hydrogen and alkyl radicals containing from 1 to 10 carbon atoms and radicals in which $R^1$ and $R^2$ together with the nitrogen atom form a heterocyclic ring; $R^3$ is selected from the group consisting of hydrogen and alkyl radicals containing from 1 to 10 carbon atoms; and $R^4$ and $R^5$ are selected from the group consisting of hydrogen and alkyl radicals containing from 1 to 6 carbon atoms.

2. A compound in accordance with claim 1 wherein $R^1$ and $R^2$ are methyl radicals and $R^3$ in hydrogen.

3. A compound in accordance with claim 1 wherein $R^1$ and $R^2$ are methyl radicals and $R^3$, $R^4$ and $R^5$ are hydrogen.

4. The compound 1-(2' - benzothiazolylthio) - 3-(dimethylthiocarbamoylthio)-isopropylidenimine.

5. The compound N-cyclohexyl-1-(2'-benzothiazolylthio)-3 - (dimethylthiocarbamoylthio) - isopropylidenimine.

6. A sulfur curable rubber composition containing from 0.05 to 5.0 parts by weight per 100 parts by weight of rubber of a compound in accordance with claim 1.

7. A sulfur curable rubber composition containing from 0.05 to 5.0 parts by weight per 100 parts by weight of rubber of 1-(2'-benzothiazolylthio)-3-(dimethylthiocarbamoylthio)-isopropylidenimine.

8. A sulfur curable rubber composition containing from 0.05 to 5.0 parts by weight of rubber of N-cyclohexyl - 1-(2' - benzothiazolylthio) - 3-(dimethylthiocarbamoylthio)-isopropylidenimine.

9. The method of making a compound according to claim 1 wherein $R^1$ and $R^2$ are methyl radicals and $R^4$ and $R^5$ are hydrogen comprising reacting acetonyl dimethyl dithiocarbamate with a 2,2'-dithiobisbenzothiazole and a nitrogen containing compound selected from the group consisting of ammonia and a primary amine in the presence of an inert organic solvent.

10. The method of making a compound according to claim 1 comprising reacting an acetylalkyl dialkyldithiocarbamate with a 2,2'-dithiobisbenzothiazole and a nitrogen containing compound selected from the group consisting of ammonia and a primary amine.

References Cited

UNITED STATES PATENTS 2,983,726   5/1961   Hendry _____ 260—243

JOSEPH L. SCHOFER, *Primary Examiner.*

D. DENENBERG, *Assistant Examiner.*